Nov. 19, 1929.                A. J. WEST                1,736,335
LUBRICATING SYSTEM
Filed Sept. 25, 1925
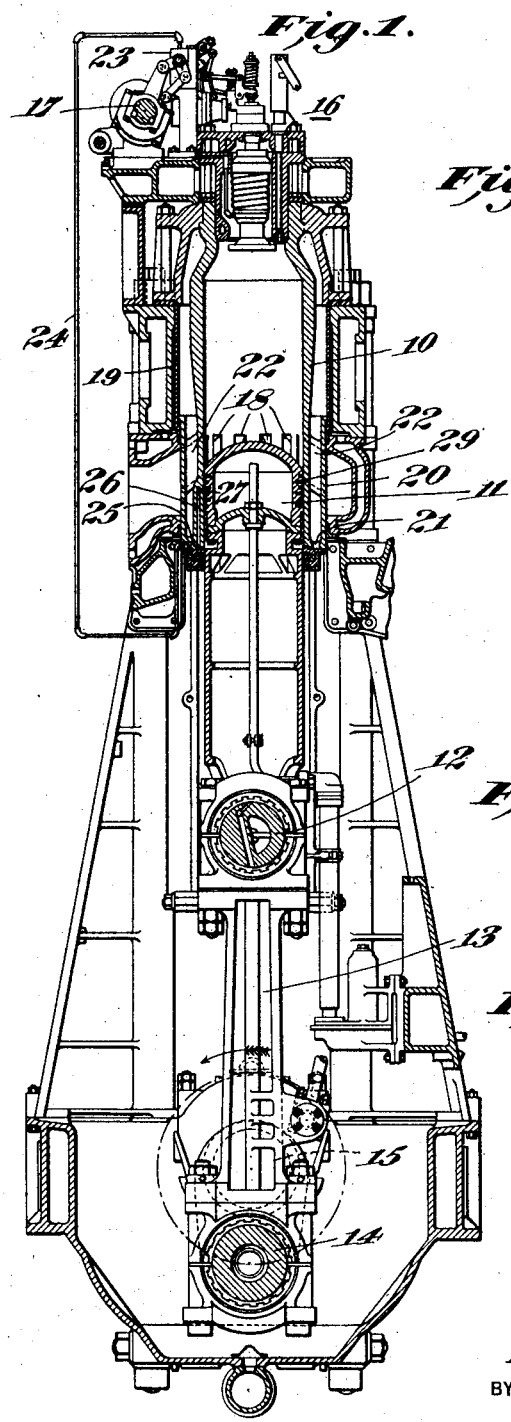
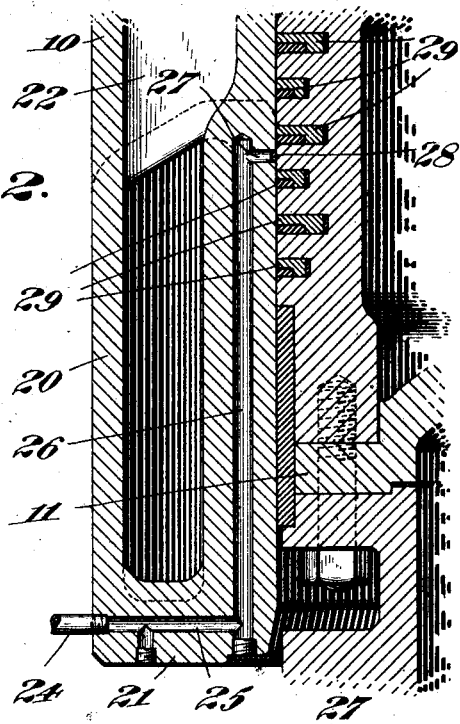
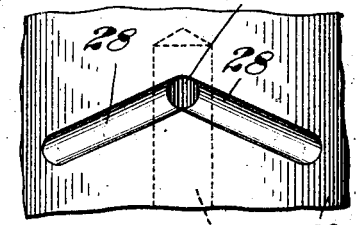
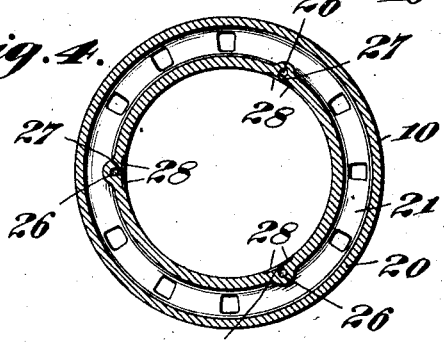
INVENTOR
Arthur Jackson West.
BY R. S. A. Dougherty and
a. B. Reavis
ATTORNEY Patented Nov. 19, 1929

1,736,335

UNITED STATES PATENT OFFICE

ARTHUR JACKSON WEST, OF BETHLEHEM, PENNSYLVANIA, ASSIGNOR TO BETHLEHEM STEEL COMPANY

LUBRICATING SYSTEM

Application filed September 25, 1925. Serial No. 58,643.

My invention relates to internal combustion engines, more particularly of the Diesel type, and it has for an object to provide an improved method and apparatus for lubricating devices of this character which shall provide for effective lubrication throughout all strokes.

A further object of my invention is to provide a system for lubricating internal combustion engines which shall be particularly resistant to the corrosive effects of cooling water.

A further object of my invention is to provide an outlet for oil within the cylinder which shall extend helically with respect to the latter, whereby oil may be effectively distributed on the piston and cylinder surfaces and whereby carbon or any sediment may be wiped out by a piston.

A further object of my invention is to provide a force-feed oiling system which shall operate in timed relation with respect to an engine and which shall discharge oil between the cylinder and the piston while the latter is at its outer approximate dead center position, or at the end of its explosion stroke.

The engine illustrated in the drawings, accompanying and forming a part of this application, is of the two-cycle Diesel type such as disclosed and claimed in my application, Serial No. 422,753, filed November 9, 1920, and assigned to the Bethlehem Steel Company; and the principal objects of the present invention are to provide a simple, durable and effective lubricating system for an engine of this character, although it is to be understood that the lubricating system constituting the present invention might be used in connection with an engine of any suitable type. The present lubricating system incorporates a pump operating in timed relation with respect to an engine piston which is provided with an outlet conduit adapted to discharge between the piston and the cylinder when the piston is at its outer dead center position, or at the end of the explosion stroke, whereby the system is not subject at any time to conditions in the explosion chamber and whereby the necessity for a check valve at the outlet end is rendered unnecessary. Durability is enhanced by having the passages drilled through the casting of the cylinder instead of providing conduits which would have to be fitted through the jacket and cylinder walls and which would be particularly subject to corrosive effects of cooling water, for example, sea water. The effectiveness of the present system is due to the fact that adequate lubrication is assured for all strokes. With those systems in which the lubricant outlet is exposed to the combustion space at times, lubrication taking place upon the compression or exhaust strokes, although a film of oil is left upon the interior cylinder surface upon the firing stroke, such film is burned off with the result that, on the next stroke, the piston and cylinder surfaces are inadequately lubricated. This effect cannot occur with my present system for the reason that lubricant is injected between the cylinder and the piston at the end of the explosion stroke at such places and in such a quantity that thorough lubrication is assured on the next stroke of the piston after the explosion stroke.

In the accompanying drawings, forming a part of this application:

Fig. 1 is a vertical sectional view of an engine showing my invention applied thereto;

Fig. 2 is an enlarged fragmentary sectional view showing the conduit arrangement;

Fig. 3 is a detail fragmentary view showing the lubricant outlet recesses in the interior cylinder surface; and, Fig. 4 is a transverse sectional view of a cylinder.

Referring now to the drawings for a better understanding of my invention, I show an internal combustion engine having a cylinder 10, with a piston 11 therein, the latter being pivotally connected, at 12, to a connecting rod 13, which engages a crank portion 14 of a crank shaft 15. The engine illustrated is of the two-cycle type; and, therefore, scavenging air and fuel are supplied by valve structure indicated generally at 16, which valve structure is operated in properly timed relation with respect to the engine by a cam shaft 17, which is connected or geared in the usual manner with respect to the crank shaft 15. The cylinder 10 is provided with exaust outlets 18 near the end thereof opposite to the valve structure. A suitable cooling jacket construction 19 surrounds the cylinder 10 and it includes a jacket member 20 which is joined to the lower end of the cylinder 10 by an integral annular web portion 21. The exhaust outlets 18 are provided by integral conduit portions 22 which bridge the jacket space between the walls 20 and 10.

My present invention consists in supplying lubricant to the interior of the cylinder between the surface of the latter and a piston when the piston is at the end of its explosion stroke. To this end, I show a pump 23 which is operated by the cam shaft 17, and, therefore, in timed relation with respect to the piston 11, provided with a discharge conduit 24 which communicates with a drilled passage 25 extending through the annular web 21, the passage 25 communicating with a drilled passage 26 extending within the portion of the wall of the cylinder at the side of the exhaust outlets 18 remote from the explosion side and communicating with a port 27 which extends to the interior of the cylinder surface and opens into recesses 28 which are inclined and extend circumferentially with respect to the cylinder and away from the exhaust openings.

With this arrangement, the pump 23 is operated in timed relation with respect to the engine piston 11 and oil is injected through the passageways and into the recesses 28 when the piston 11 is in its outer approximately dead center position, or at the end of the explosion stroke thereof, the piston 11 occupying such a position at that time that piston rings 29 will be at both sides of the oil inlet.

In order that a piston may be thoroughly lubricated circumferentially, I prefer to provide a plurality of drilled passages 25 and 26, ports 27 and inclined passages 28. In Fig. 4, I show a cylinder which incorporates three sets of these passages, ports and recesses. With a plurality of sets of drilled passages, ports and recesses, all of the drilled passages 25 have communication with respect to the discharge of the pump 23, whereby oil will be injected simultaneously into all of the interior recesses 28.

As lubricant is discharged between the cylinder and piston surfaces when the piston is at its outer dead center position, or at the end of its explosion stroke, upon the next stroke, compression for two-cycle or exhaust for four-cycle engines, the surfaces of the cylinder and of the piston will be adequately lubricated. Since the passageways 25 and 26 are drilled through the web portions 21 and within the material of the lower portion of the cylinder wall 10, there are no oil conduits bridging the jacket space and made of material which may be attacked by cooling water.

While I have shown my invention in but one form, it will be obvious to those skilled in the art that it is not so limited, but is susceptible of various other modifications and changes without departing from the spirit thereof, and I desire, therefore, that only such limitations shall be placed thereupon as are imposed by the prior art or as are specifically set forth in the appended claims.

Having thus described the invention what I claim as new and desire to secure by Letters Patent is:

1. In an internal combustion engine, the combination of a cylinder having a jacket member joined to one end thereof by an integral annular web portion and an oil conduit leading to the interior of the cylinder consisting of communicating drilled passages in the web portion and in the cylinder wall.

2. In an internal combustion engine, the combination of a cylinder having exhaust openings near one end thereof and a jacket member joined to the end of the cylinder by an integral annular web portion at the side of the exhaust openings remote from the explosion side and an oil conduit leading to the interior of the cylinder consisting of communicating drilled passages in the web portion and in the cylinder wall at the side of the exhaust openings opposite to the explosion side.

3. In an internal combustion engine, the combination of a cylinder having exhaust openings near one end thereof and a jacket member joined to the end of the cylinder opposite to the explosion end by an integral annular web portion, an oil conduit leading to the interior of the cylinder and consisting of communicating drill passages in the web portion and in the cylinder wall at the side of the exhaust openings opposite to the explosion side, and a recess arranged interiorly of the cylinder, communicating with the oil conduit and extending circumferentially and away from the exhaust openings.

In testimony whereof I hereunto affix my signature this eighteenth day of September, 1925.

ARTHUR JACKSON WEST.